(12) United States Patent
Shijo et al.

(10) Patent No.: US 6,392,820 B1
(45) Date of Patent: May 21, 2002

(54) OPTICAL SYSTEM OF A COMPOSITE CAMERA

(75) Inventors: Kae Shijo; Shinichiro Ishii; Takayuki Ito, all of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,339

(22) Filed: Apr. 6, 2000

(30) Foreign Application Priority Data

Apr. 8, 1999 (JP) .......................................... 11-101552
Apr. 8, 1999 (JP) .......................................... 11-101553

(51) Int. Cl.$^7$ .......................... G02B 17/00; G03B 17/48
(52) U.S. Cl. ...................... 359/726; 359/679; 359/434; 359/738; 396/114; 396/374; 396/429
(58) Field of Search .................................. 359/679, 726, 359/738, 434; 396/114, 374, 429

(56) References Cited

U.S. PATENT DOCUMENTS 5,664,243 A * 9/1997 Okada et al. ................. 396/246
5,680,249 A * 10/1997 Ishikawa et al. ............. 359/434
6,314,247 B1 * 11/2001 Mogamiya et al. .......... 396/384

FOREIGN PATENT DOCUMENTS

JP  8-184757  7/1996

* cited by examiner

Primary Examiner—Evelyn A Lester
(74) Attorney, Agent, or Firm—Greenblum & Bernstein, P.L.C.

(57) ABSTRACT

An optical system of a composite camera including a first image-forming optical system, a second image-forming optical system, and a condenser lens group, which includes two or more lens elements, or includes a single lens element on which at least one aspherical surface is formed; and at any image height on the equivalent image plane, the following condition is satisfied:

$$\Delta\theta Pmax - \Delta\theta Pmin < 2° \ldots \quad (1)$$

wherein $\Delta\theta Pmax$ designates the maximum value of $\Delta\theta P(y) = \theta BP(y) - \theta AP(y)$; $\Delta\theta Pmin$ designates the minimum value of $\Delta\theta P(y) = \theta BP(y) - \theta AP(y)$; $\theta AP(y)$ designates an angle of incidence, at an image height y, of a principal ray to be incident on the equivalent image plane (the image plane of the first image-forming optical system); and $\theta BP(y)$ designates an angle of incidence, at the image height y on the equivalent image plane, of a principal ray to be incident on the predetermined position (re-imaging plane).

4 Claims, 13 Drawing Sheets

1:10.4

-0.1  0.1
SPHERICAL
ABERRATION
THE SINE
CONDITION

— SA
-- SC

W=34.4°

-0.05  0.05
LATERAL
CHROMATIC
ABERRATION

— d Line
---- g Line
--- C Line

W=34.4°

-0.2  0.2
ASTIGMATISM

— S
-- M

W=34.4°

-5.0(%)5.0
DISTORTION

1:10.4

-0.1  0.1
SPHERICAL
ABERRATION
THE SINE
CONDITION

— SA
-- SC

W=34.4°

-0.05  0.05
LATERAL
CHROMATIC
ABERRATION

— d Line
---- g Line
--- C Line

W=34.4°

-0.2  0.2
ASTIGMATISM

— S
-- M

W=34.4°

-5.0(%)5.0
DISTORTION

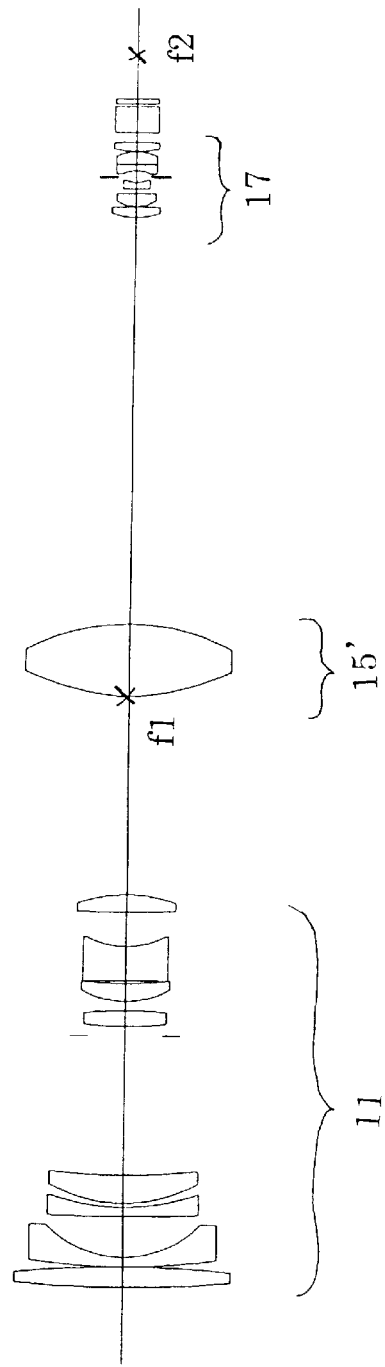
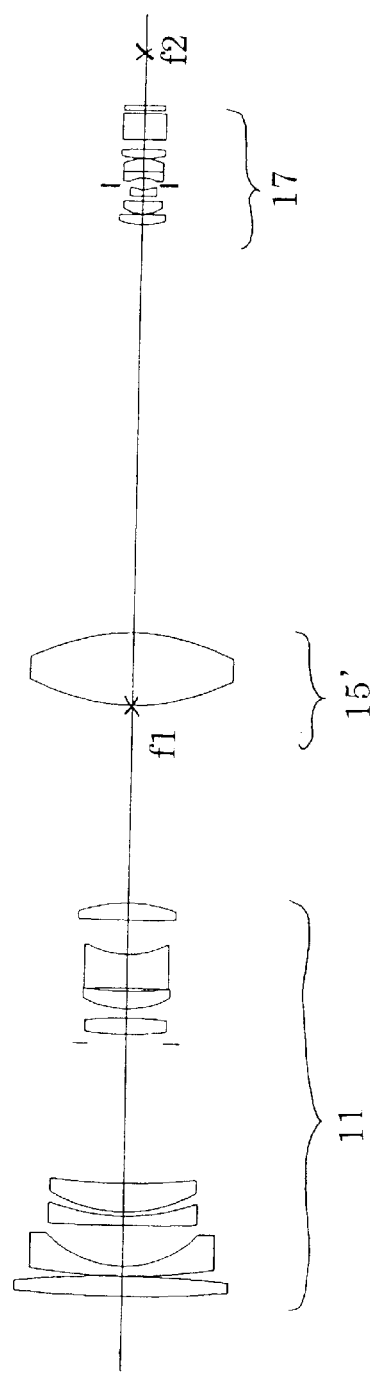

Fig.13A    Fig.13B    Fig.13C    Fig.13D
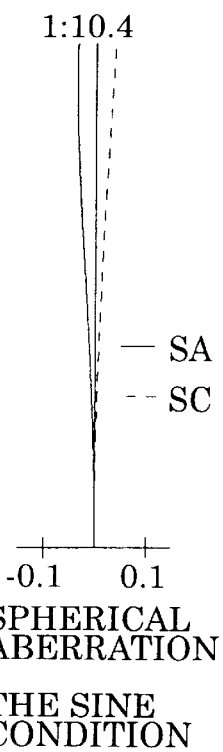
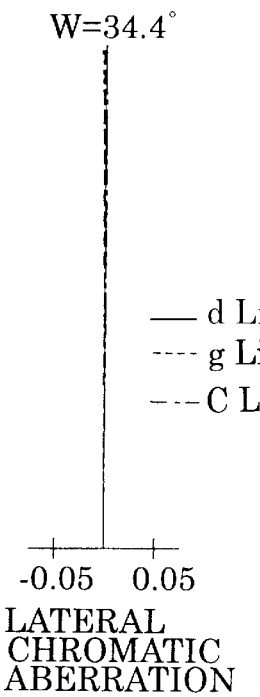
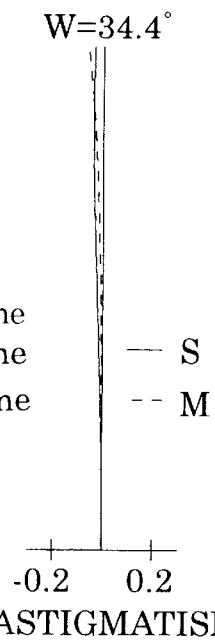
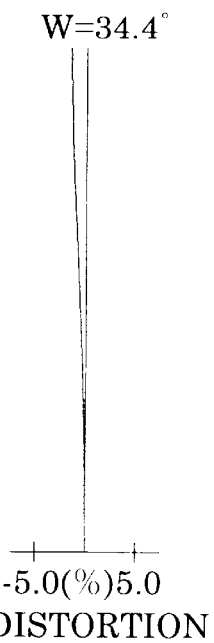
Fig.15A    Fig.15B    Fig.15C    Fig.15D
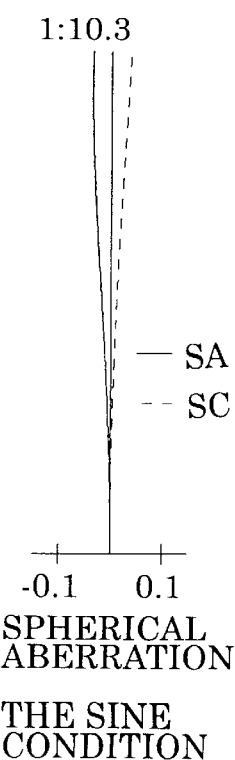
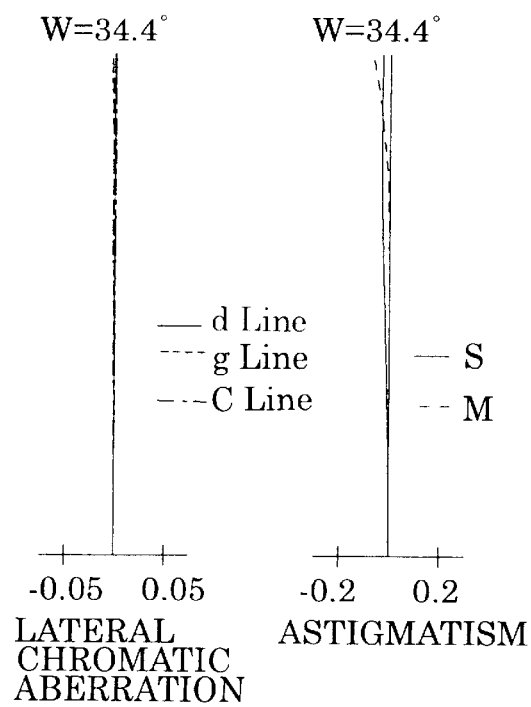
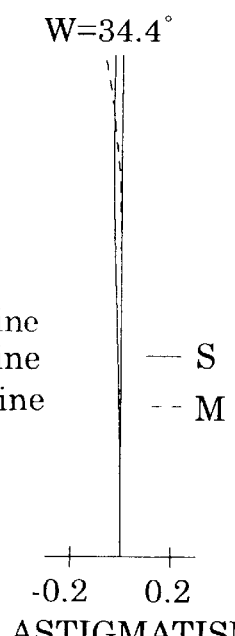
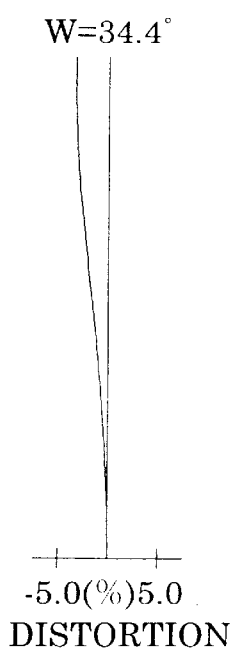

Fig.17A
1:10.4
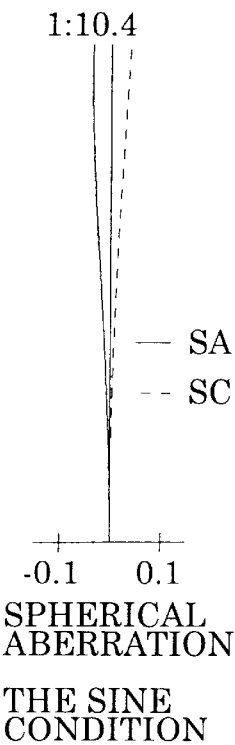
— SA
-- SC
-0.1  0.1
SPHERICAL
ABERRATION
THE SINE
CONDITION
Fig.17B
W=34.4°
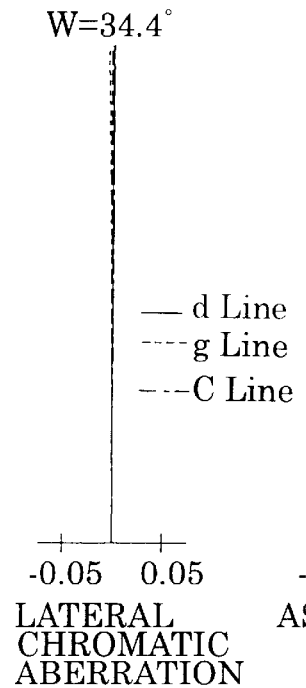
— d Line
---- g Line
--- C Line
-0.05  0.05
LATERAL
CHROMATIC
ABERRATION
Fig.17C
W=34.4°
— S
-- M
-0.2  0.2
ASTIGMATISM
Fig.17D
W=34.4°
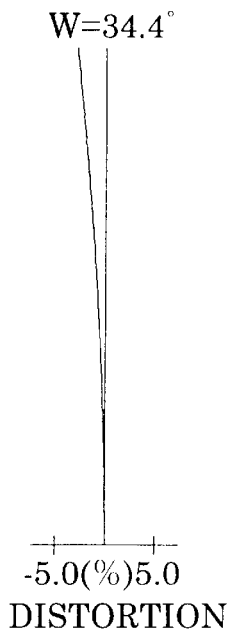
-5.0(%)5.0
DISTORTION
Fig.19A
1:10.3
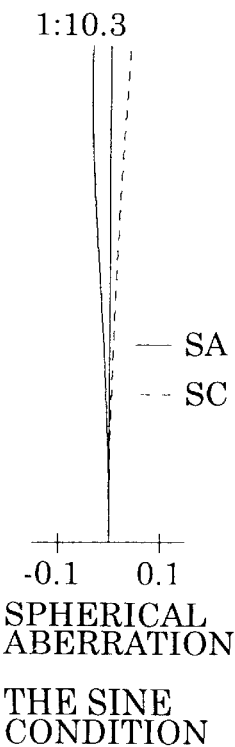
— SA
-- SC
-0.1  0.1
SPHERICAL
ABERRATION
THE SINE
CONDITION
Fig.19B
W=34.4°
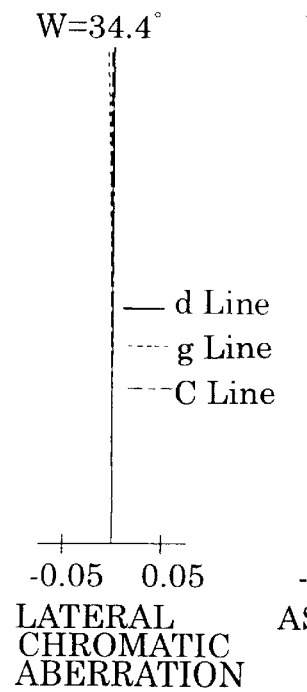
— d Line
---- g Line
--- C Line
-0.05  0.05
LATERAL
CHROMATIC
ABERRATION
Fig.19C
W=34.4°
— S
-- M
-0.2  0.2
ASTIGMATISM
Fig.19D
W=34.4°
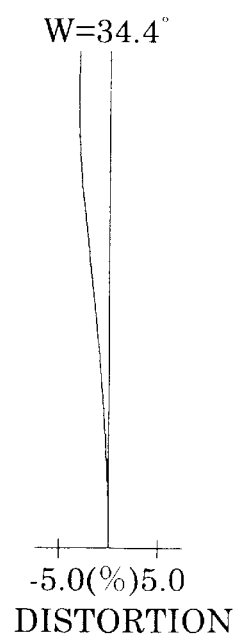
-5.0(%)5.0
DISTORTION

OPTICAL SYSTEM OF A COMPOSITE CAMERA

BACKGROUND OF THE INVENTION

1. Field of the Invention

The present invention relates to an optical system in which substantially the same images can be formed at two or more different positions by branching or switching an optical path from a single photographing optical system into predetermined number of optical paths, and in particular, relates to an optical system in which images can be formed at two or more different positions at different magnifications, and further to an optical system which can be used in a surveillance camera system and the like, called a composite camera, which are required to form images simultaneously on an image pick-up device and a silver halide film, which have differently sized image planes.

2. Description of the Related Art

As a typical conventional surveillance camera system, a single-lens-reflex type surveillance camera is well known in the art. In the above surveillance camera, a bundle of rays transmitted through a photographing optical system (the first image-forming optical system) is reflected by a mirror, and the image of an object is formed on an equivalent image plane; and further, through a relay optical system (the second image-forming optical system), the image formed on the equivalent image plane is re-imaged on an image pick-up device (CCD: a re-image forming plane).

In the above surveillance camera, a condenser lens group is provided behind the equivalent image plane so that the exit pupil of the photographing lens system and the entrance pupil of the relay optical system becomes optically conjugate (hereinafter, conjugate). In other words, the condenser lens group establishes the conjugate relationship between the pupils of the first and second image-forming optical systems.

However, in the case where a mechanical diaphragm with a variable aperture for controlling an exposure on the image plane of the first image-forming optical system is provided in the photographing optical system of a conventional composite camera, the smaller the variable aperture becomes, the more an eclipse occurs with respect to off-axis rays towards the relay optical system, and thereby peripheral illumination is extremely reduced. The optical system with such a problem is not suitable for practical use. In other words, the optical system of a conventional composite camera cannot adequately control an exposure.

SUMMARY OF THE INVENTION

It is an object of the present invention to provide an optical system for a composite camera (i) which includes a first image-forming optical system, and a second image-forming optical system for re-imaging an image, formed on an image plane equivalent to an image plane of the first image-forming optical system, onto a predetermined position, and (ii) in which no eclipse occurs with respect to off-axis rays towards the second image-forming optical system even when a mechanical diaphragm with a variable aperture is provided in the first image-forming optical system, and even when the aperture of the mechanical diaphragm is made smaller. In other words, the object of the present invention is to provide the optical system for the composite camera in which the mechanical diaphragm can be provided in the first image-forming optical system without causing any adverse effect on peripheral illumination around the re-image forming plane.

The conception of the present invention is based on the following factors which are the causes of the above problem:
(i) the exit pupil of the first image-forming optical system and the entrance pupil of the second image-forming optical system is conjugate only in the vicinity of the optical axis; and
(ii) when a diaphragm is provided in the first image-forming optical system, i.e., an effective aperture thereof is reduced, an eclipse occurs in the second image-forming optical system.

According to the present invention, there is provided an optical system of a composite camera including a first image-forming optical system, and a second image-forming optical system for re-imaging an image, formed on an image plane equivalent to an image plane of the first image-forming optical system (hereinafter, equivalent image plane), onto a predetermined position (hereinafter, re-imaging plane). The optical system of the composite camera further includes a condenser lens group, which includes two or more lens elements, or includes a single lens element on which at least one aspherical surface is formed, is provided between the equivalent image plane and the second image-forming optical system; and at any image height on the equivalent image plane, the following condition is satisfied:

$$\Delta\theta Pmax - \Delta\theta Pmin < 2° \quad \ldots \quad (1)$$

wherein
$\Delta\theta Pmax$ designates the maximum value of $\Delta\theta P(y) = \theta BP(y) - \theta AP(y)$;
$\Delta\theta Pmin$ designates the minimum value of $\Delta\theta P(y) = \theta BP(y) - \theta AP(y)$;
$\theta AP(y)$ designates an angle of incidence, at an image height y, of a principal ray which is transmitted through the first image-forming optical system, and is incident on the equivalent image plane (the image plane of the first image-forming optical system); and
$\theta BP(y)$ designates an angle of incidence, at the image height y on the equivalent image plane, of a principal ray to be incident on the re-imaging plane, through the first image-forming optical system, the condenser lens group and the second image-forming optical system.

By satisfying condition (1) at any image height on the equivalent image plane, the conjugate relationship between the exit pupil of the first image-forming optical system and the entrance pupil of the second image-forming optical system can be established not only in the vicinity of the optical axis but also over the entire pupil area. As a result, even if an effective aperture of the first image-forming optical system is reduced, no harmful eclipse occurs in the second image-forming optical system. In other words, a mechanical diaphragm with a variable aperture can be provided in the first image-forming optical system. Consequently, it is possible to provide a diaphragm in the second image-forming optical system as well.

More concretely, the first image-forming optical system is a photographing optical system with respect to a silver halide film; and the second image-forming optical system is a photographing optical system with respect to an image pick-up device.

Further, the present invention can be applied to an optical system in a single-lens-reflex type optical device in which the equivalent image plane is formed by a mirror which is positioned between the first image-forming optical system and the image plane thereof.

The present disclosure relates to subject matters contained in Japanese Patent Applications No. Hei-11-101552 (filed on Apr. 8, 1999) and Hei-11-101553 (filed on Apr. 8, 1999) which are expressly incorporated herein by reference in their entirety.

BRIEF DESCRIPTION OF THE DRAWINGS

The invention will be discussed below in detail with reference to the accompanying drawings, in which:

FIG. 12 is a lens arrangement of the third embodiment of the optical system of the composite camera;

FIGS. 13A, 13B, 13C and 13D are aberration diagrams of the lens arrangement shown in FIG. 12;

FIG. 14 is a lens arrangement of the fourth embodiment of the optical system of the composite camera;

FIGS. 15A, 15B, 15C and 15D are aberration diagrams of the lens arrangement shown in FIG. 14;

FIGS. 17A, 17B, 17C and 17D are aberration diagrams of the lens arrangement shown in FIG. 16;

FIGS. 19A, 19B, 19C and 19D are aberration diagrams of the lens arrangement shown in FIG. 18.

DESCRIPTION OF THE PREFERRED EMBODIMENTS

Figure 1:
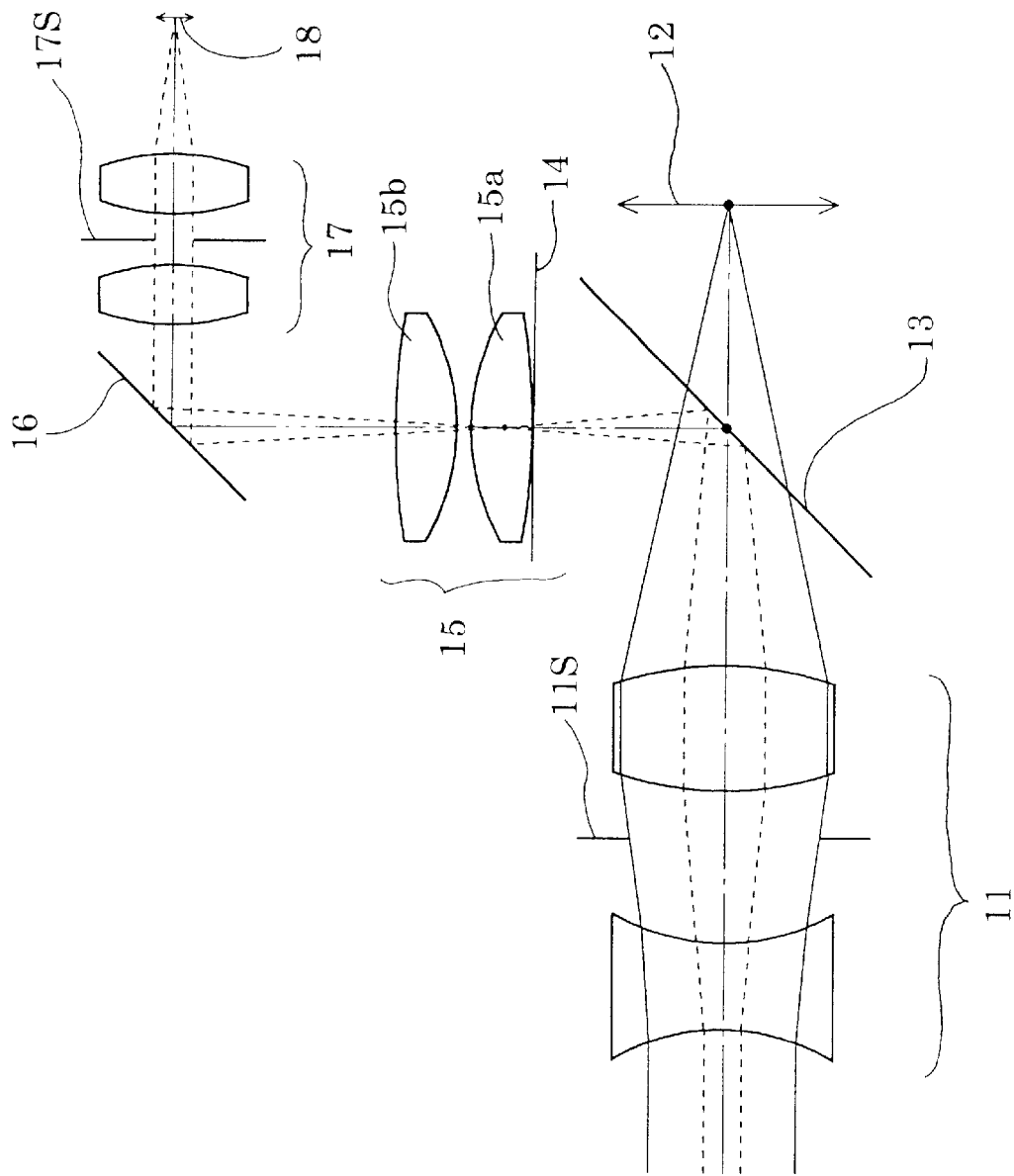
FIG. 1 is an optical arrangement showing the first aspect of an optical system of a composite camera according to the present invention applied to a single-lens-reflex type surveillance camera.

FIG. 1 is an optical arrangement showing the first aspect of an optical system of a composite camera applied to a single-lens-reflex type surveillance camera. The optical system includes a photographing optical system 11 (a first image-forming optical system), a quick-return mirror 13, a condenser lens group 15, a mirror 16 and a rely optical system 17 (a second image-forming optical system), in this order from an object. The quick-return mirror 13 is positioned between the photographing optical system 11 and the image plane 12 thereof. An image-carrying bundle of rays transmitted through the photographing optical system 11 and reflected by the quick-return mirror 13 is imaged on an equivalent image plane 14 which is optically equivalent to the image plane 12. The image formed on the equivalent image plane 14 is transmitted through the condenser lens group 15, the mirror 16 and the rely optical system 17, and is imaged on an image pick-up device 18 (CCD: a re-image forming plane). The image formed on the re-image forming plane 18 is photoelectrically converted and is displayed on a monitor as image information. The quick-return mirror 13 is positioned to transmit a bundle of rays from the photographing optical system 11 to the equivalent image plane 14. When photographing on a film positioned on the image plane 12 is required, the quick-return mirror 13 is retracted from the light path to the image plane 12, and thereby the film on the image plane 12 is exposed by a bundle of rays from the photographing optical system 11. In FIG. 1, a focal plane shutter positioned before the image plane 12 is not depicted. Further, mechanical diaphragms 11S and 17S in which the aperture is variable are respectively provided in the photographing optical system 11 and the relay optical system 17.

In the first aspect of the optical system of the composite camera, the condenser lens group 15 includes two lens elements 15a and 15b. The condenser lens group 15 and the relay optical system 17 are arranged so that condition (1) is satisfied at any image height on the equivalent image plane 14. The condenser lens group 15 as a whole has a positive power. The lens elements 15a and 15b are therefore formed to have spherical surfaces; on the other hand, if at least one aspherical surface is formed, condition (1) can more easily be satisfied.

Figure 2:
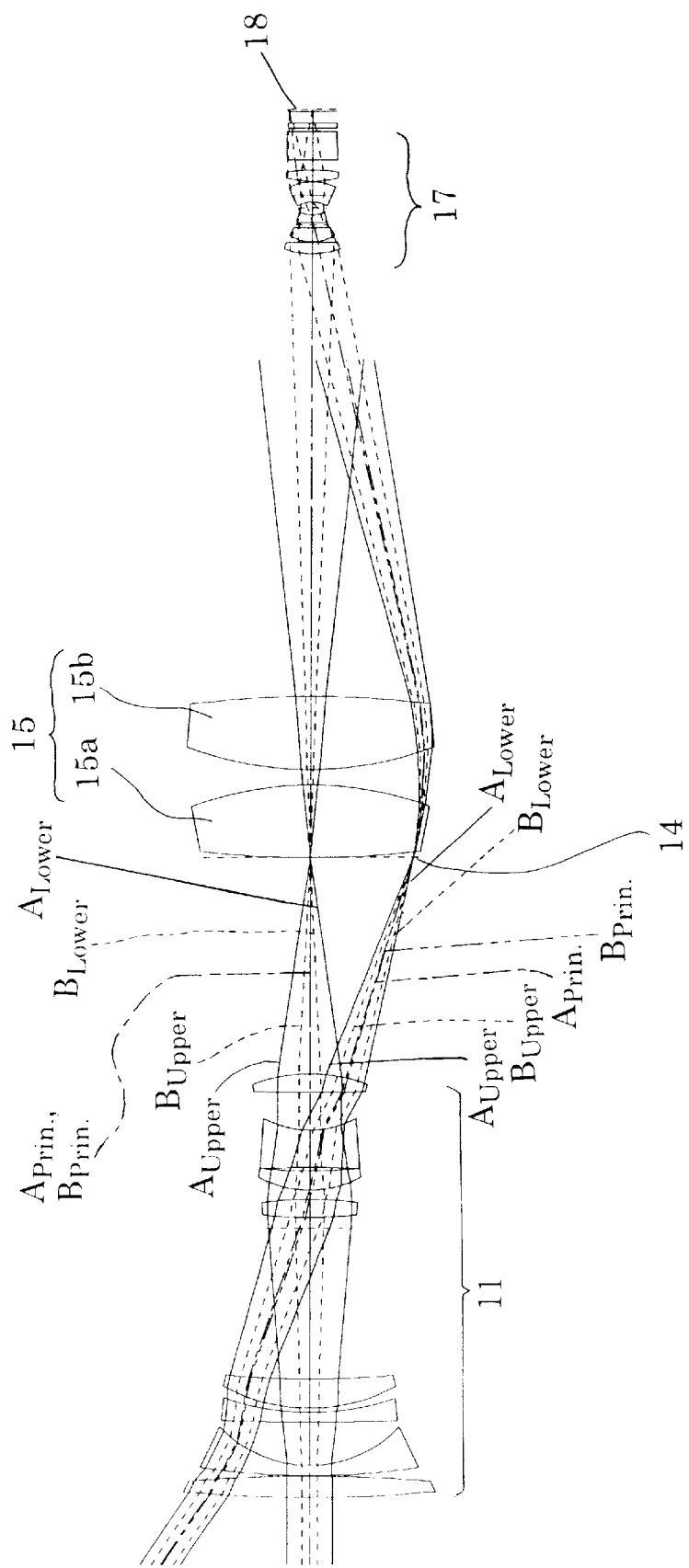
FIG. 2 shows the upper and lower light rays of an on-axis bundle of rays and the principal ray thereof, and the upper and lower light rays of an off-axis bundle of ray and the principal ray thereof, all of which are depicted on a development view of the optical system of the composite camera of FIG. 1.
Figure 3:
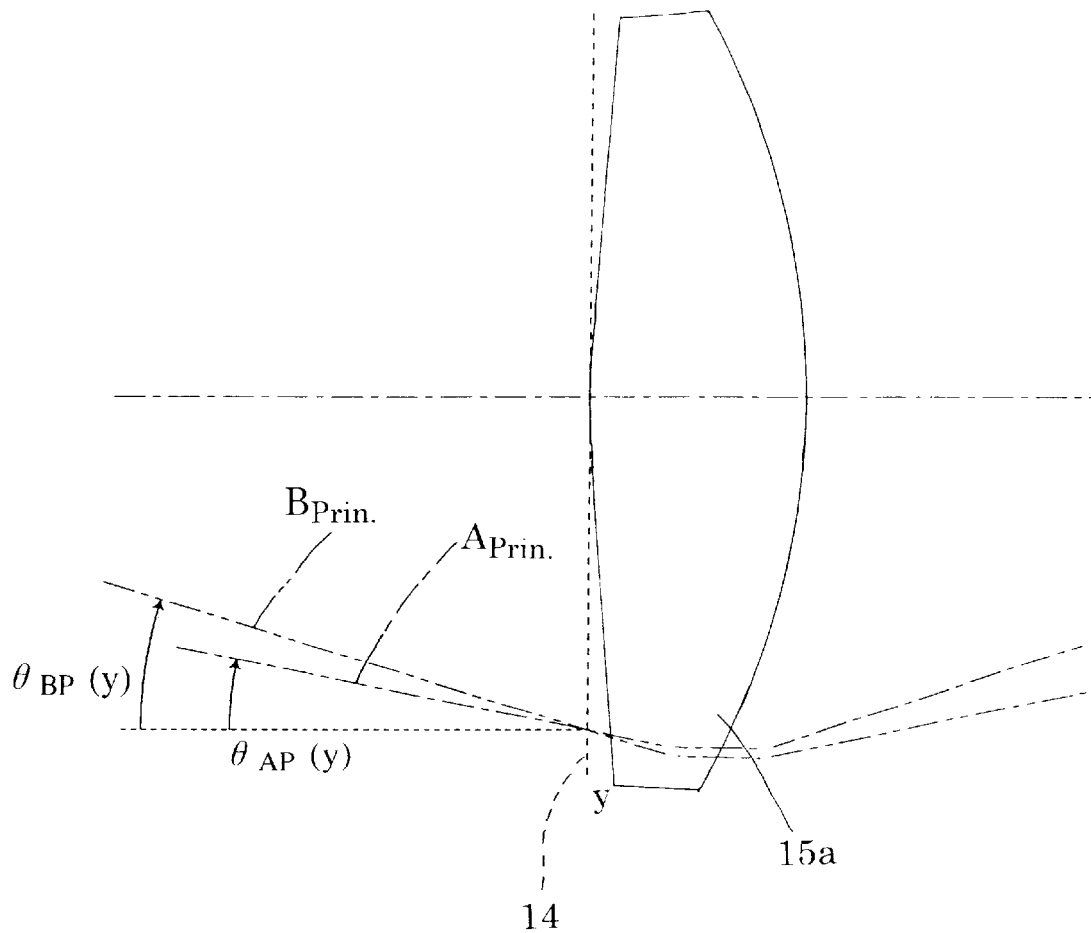
FIG. 3 is a partial enlarged view of the optical system shown in FIG. 2.

FIG. 2 is depicted by developing the reflection surfaces of the quick-return mirror 13 and the mirror 16 to show the upper and lower light rays of an on-axis bundle of rays and the principal ray thereof, and to show the upper and lower light rays of an off-axis bundle of rays and the principal ray thereof; and FIG. 3 is a partial enlarged view in the vicinity of the equivalent image plane 14. The on-axis and off-axis bundles of rays A with solid lines indicate light rays towards the equivalent image plane 14 (the image plane 12), while the on-axis and off-axis bundles of rays B with dotted lines indicate light rays to be incident on the re-imaging plane 18, through the photographing optical system 11, the condenser lens group 15 and the relay optical system 17. The following symbols are used for the above light rays:

$A_{Prin}$ and $B_{Prin}$: a principal ray;

$A_{Upper}$ and $B_{Upper}$: a upper light ray; and $A_{Lower}$ and $B_{Lower}$: a lower light ray.

The upper and lower light rays are defined as light rays running along a transverse cross-section including the optical axis, and passing through the periphery of the pupil. The principal ray is defined as a light ray positioned in the middle of the upper and lower light rays on the transverse cross-section.

Condition (1) will be discussed along with these figures. The principal rays APrin which are incident on the equivalent image plane 14 (the image plane 12) is solely determined by the photographing optical system 11 regardless of the condenser lens group 15 and the relay optical system 17 (refer to FIG. 1). On the other hand, in determining the light paths of the principal rays $B_{Prin}$ to be incident on the image pick-up device 18, the photographing optical system 11, the condenser lens group 15 and the relay optical system 17 should be considered, since the principal rays $B_{Prin}$ are refracted by the condenser lens group 15 and the relay optical system 17, after passing through the equivalent image plane 14. Accordingly, an angle of incidence of the principal ray $B_{Prin}$ when the same passes through the equivalent image plane 14, and an angle of incidence of the principal rays $A_{Prin}$ when the same is incident on the equivalent image plane 14 (the image plane 12) are generally different.

When the optical system is depicted in an entire view such as FIG. 2, the principal rays $A_{Prin}$ and the principal rays $B_{Prin}$ appear to coincide with each other. However, due to the condenser lens group 15 and the relay optical system 17, the principal rays $A_{Prin}$ and $B_{Prin}$ do not actually coincide with each other. Moreover, in a conventional composite camera in which the exit pupil of the photographing optical system and the entrance pupil of the condenser lens group are conjugate, even if the principal rays $A_{Prin}$ and $B_{Prin}$ coincide with each other in the vicinity of the optical axis, these principal rays do not coincide with each other where an image height increases, and thereby a degree of non-coincidence between the these rays $A_{Prin}$ and $B_{Prin}$ becomes remarkable. FIG. 3 depicts the non-coincidence in an exaggerated manner. The non-coincidence is the cause of an eclipse which occurs in the relay optical system 17 when an aperture of the photographing optical system 11 is reduced.

Figure 5:
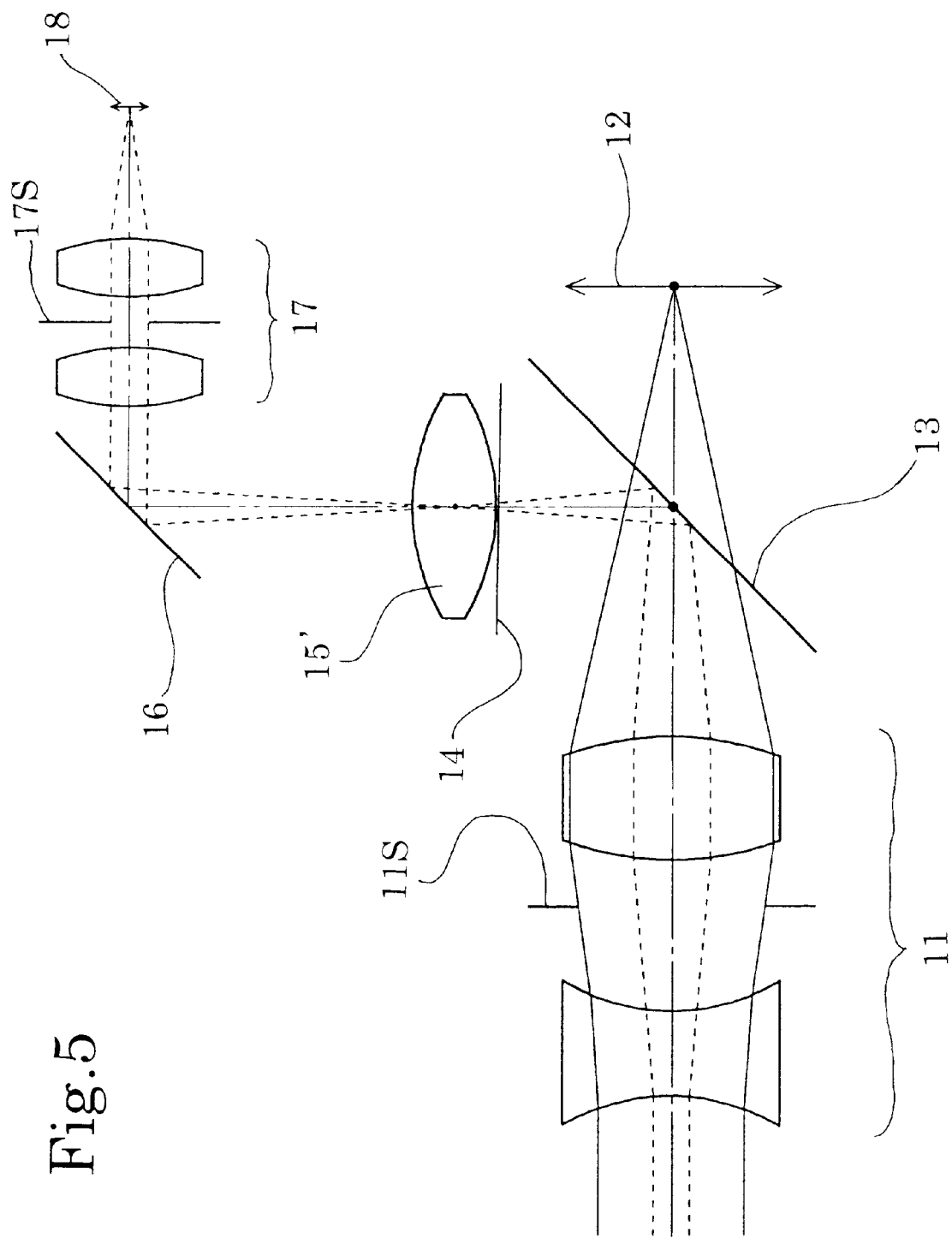
FIG. 5 is an optical arrangement showing the second aspect of the optical system of the composite camera according to the present invention applied to the single-lens-reflex type surveillance camera.
Figure 6:
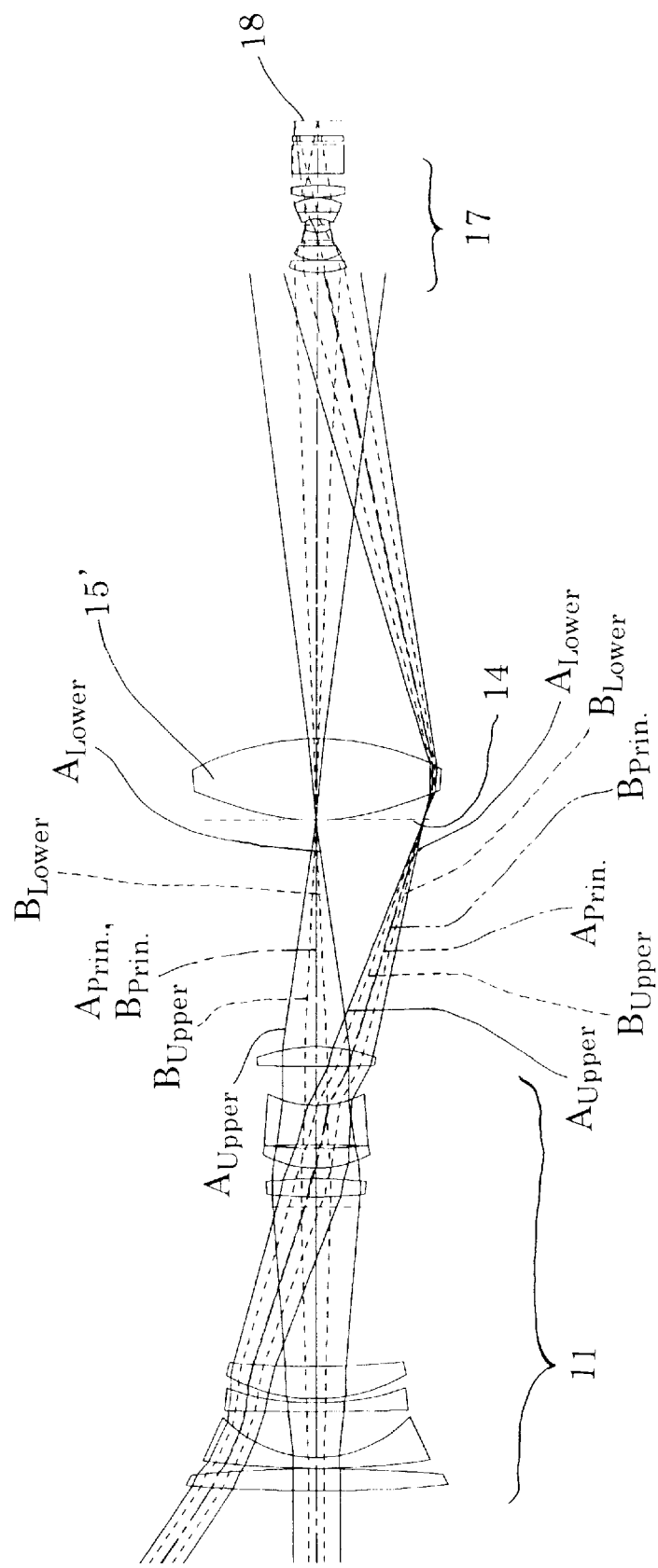
FIG. 6 shows the upper and lower light rays of an on-axis bundle of ray and the principal ray thereof, and the upper and lower light rays of an off-axis bundle of ray and the principal ray thereof, all of which are depicted on a development view of the optical system of the composite camera of FIG. 5.
Figure 7:
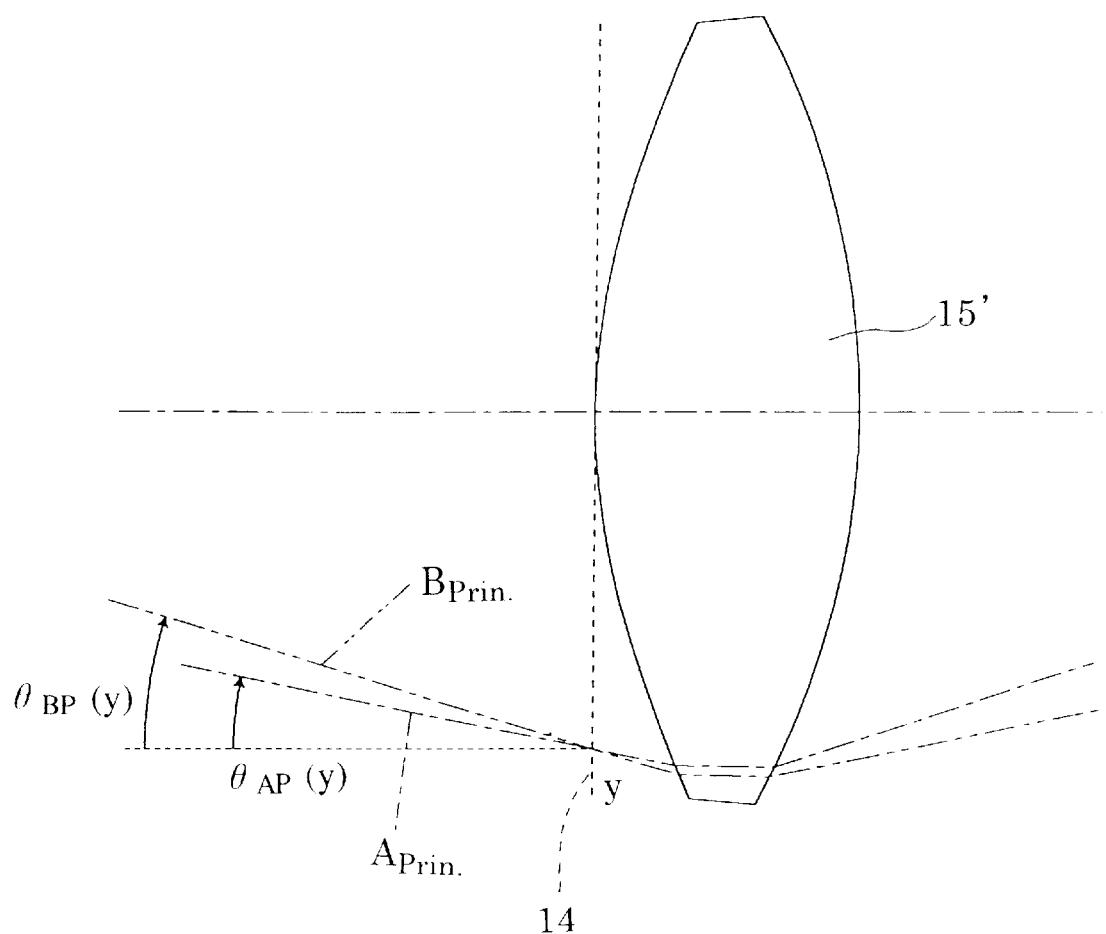
FIG. 7 is a partial enlarged view of the optical system shown in FIG. 6.

FIG. 5 is an optical arrangement showing the second aspect of the optical system of the composite camera applied to the single-lens-reflex type surveillance camera. The condenser lens group 15' includes a. single lens element having at least one aspherical surface thereon. The condenser lens group 15' and the relay optical system 17 are arranged so that condition (1) is satisfied at any image height on the equivalent image plane 14. The condenser lens group 15' as a whole has a positive power.

As discussed, the arrangement of the condenser lens group 15 (15') is the only difference between the first and second aspects. The discussions for the first aspect are applicable to the second aspect by replacing terms of the two lens elements 15a and 15b' with the single lens element with an aspherical surface.

Figure 4:
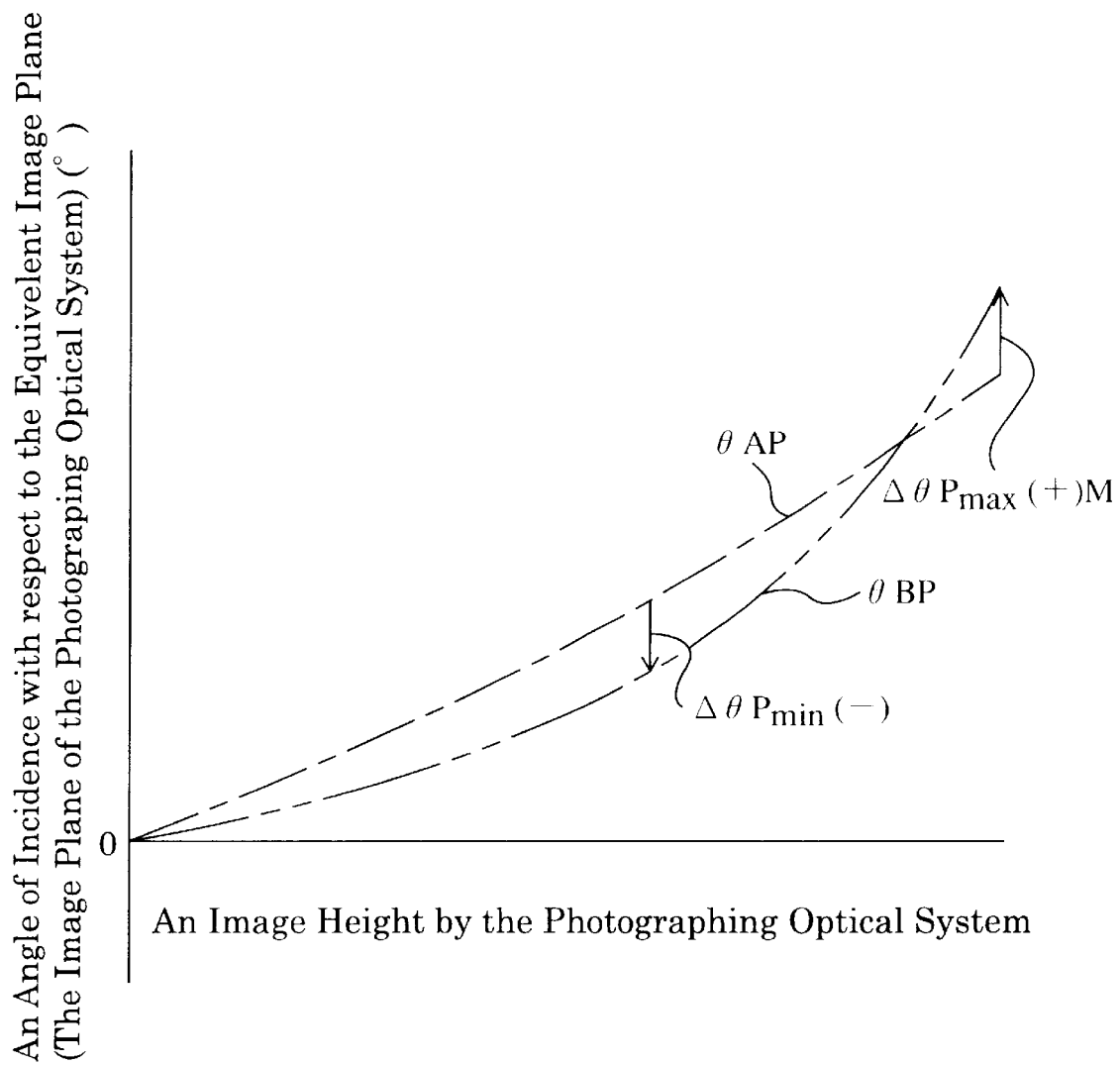
FIG. 4 is a graphical representation for explaining condition (1)

According to the first and second aspects of the optical system of the composite camera, the exit pupil of the photographing optical system 11 and the entrance pupil of the condenser lens group 15 (15') are conjugate at any image height on the equivalent image plane 14 by the following optical arrangement:

(i) the maximum value of the difference on the angles of incidence of the principal rays $A_{Prin}$ and $B_{Prin}$ at any image height on the equivalent image plane 14 (the image plane 12) is to be less than 2°, or more preferably less than 1°; and (ii) the above numerical objective is attained by the condenser lens group 15 which is constituted by the two lens elements 15a and 15b, or by the single lens element having at least one aspherical surface thereon. Condition (1) indicates the above relationship, and FIG. 4 shows an explanatory graph thereof. By satisfying condition (1), the diaphragms 11S and 17S can be provided in the photographing optical system 11 and the relay optical system 17 respectively.

Specific numerical data of the embodiments will be described hereinafter. The first and second embodiments relate to the first aspect of the optical system of the composite camera, and the third to sixth embodiments relate to the second aspect thereof. In the tables, $F_{NO}$ designates a F-number of the photographing optical system 11, $F_e$ designates an effective F-number of the relay optical system 17, f1 and f2 designate focal lengths of the photographing optical system 11 and the relay optical system 17, $f_{B1}$ and $f_{B2}$ designate back focal distances thereof respectively, W designates a half angle-of-view (°), m designates a transverse magnification, and R designates the radius of curvature of each lens surface, D designates the lens thickness or the distance between lens elements, $N_d$ designates the refractive index of the d-line, and v designates the Abbe number. In the diagrams, SA designates spherical aberration, SC designates the sine condition; in regard to lateral chromatic aberration, the solid and the two types of dotted lines respectively indicate magnification with respect to the d, g and C lines; and in regard to astigmatism, S designates the sagittal image, and M designates the meridional image. The back focal distance $f_{B2}$ of the relay optical system 17 does not include the thickness of a glass cover of the image pick-up device (CCD).

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:
x designates a distance from a tangent plane of an aspherical vertex;
C designates a curvature of the aspherical vertex (1/R);
h designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 8:
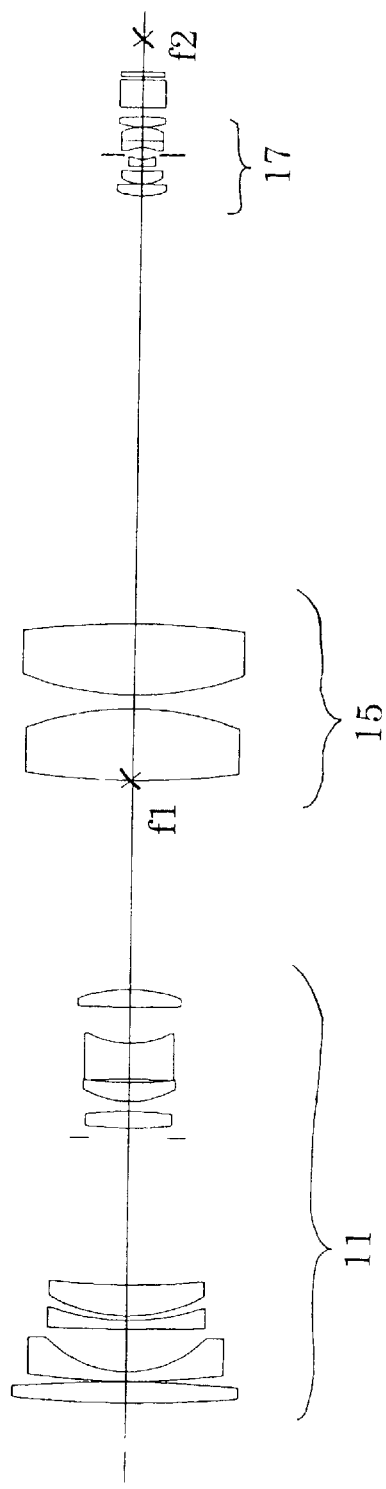
FIG. 8 is a lens arrangement of the first embodiment of the optical system of the composite camera according to the present invention.

FIG. 8 is a lens arrangement of the first embodiment of the optical system of the composite camera, and FIGS. 9A through 9D are aberration diagrams of the lens arrangement shown in FIG. 8. Table 1 shows the numerical data thereof. Surface Nos. 1 through 16 represent the photographing optical system 11; surface Nos. 17 through 20 represent the condenser lens group 15; surface Nos. 21 through 31 represent the relay optical system 17; and surface Nos. 32 through 35 represent the glass cover (filters included) of the CCD 18.

TABLE 1

| Photographing Optical System | | Relay Optical System | |
|---|---|---|---|
| $F_{NO}$ = 1:3.5 | | $F_e$ = 1:2.2 | |
| $f_1$ = 23.03 | | $f_{2}$ = 13.19 | |
| W = 34.4 | | m = −0.164 | |
| $f_{B1}$ = 32.09 | | $f_{B2}$ = 6.98 | |
| Surface No. | R | D | Nd | v |
| 1 | 206.849 | 3.07 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |

TABLE 1-continued

| | | | | |
|---|---|---|---|---|
| Diaphragm | ∞ | 1.50 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71300 | 53.9 |
| 16 | −23.537 | 32.09 | — | — |
| 17 | 133.999 | 10.99 | 1.51633 | 64.1 |
| 18 | −48.068 | 2.20 | — | — |
| 19 | 48.068 | 10.99 | 1.51633 | 64.1 |
| 20 | −133.999 | 65.62 | — | — |
| 21 | 11.525 | 1.65 | 1.69680 | 55.5 |
| 22 | 280.000 | 0.10 | — | — |
| 23 | 5.830 | 2.03 | 1.69680 | 55.5 |
| 24 | 42.520 | 0.81 | — | — |
| 25 | 505.700 | 1.05 | 1.80518 | 25.4 |
| 26 | 3.752 | 1.00 | — | — |
| Diaphragm | ∞ | 0.92 | — | — |
| 27 | −4.624 | 1.00 | 1.59270 | 35.3 |
| 28 | 336.653 | 2.03 | 1.88300 | 40.8 |
| 29 | −7.871 | 0.10 | — | — |
| 30 | 14.372 | 1.57 | 1.80400 | 46.6 |
| 31 | −33.385 | 1.54 | — | — |
| 32 | ∞ | 4.16 | 1.51633 | 64.1 |
| 33 | ∞ | 0.50 | — | — |
| 34 | ∞ | 0.75 | 1.51633 | 64.1 |
| 35 | ∞ | — | — | — |

Embodiment 2

Figure 10:
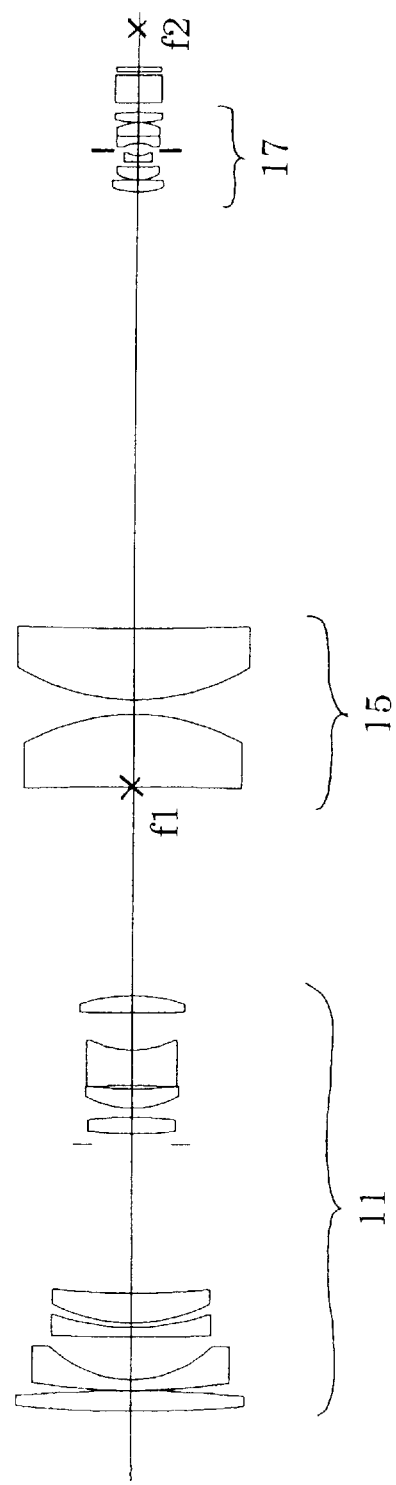
FIG. 10 is a lens arrangement of the second embodiment of the optical system of the composite camera.
Figure 9A:
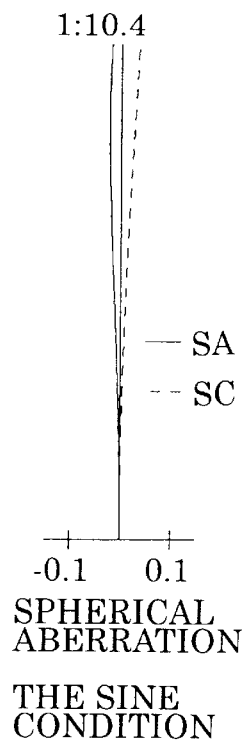
FIGS. 9A, 9B, 9C and 9D are aberration diagrams of the lens arrangement shown in FIG. 8.
Figure 9B:
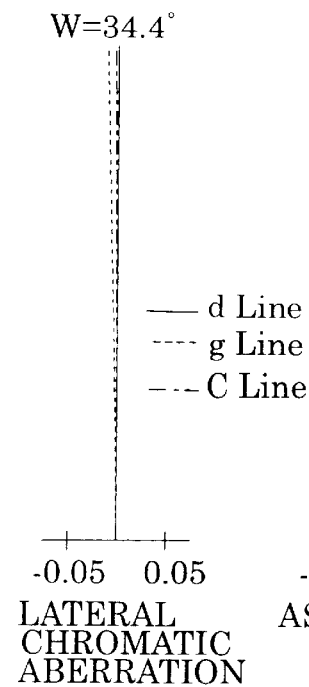
Figure 9C:
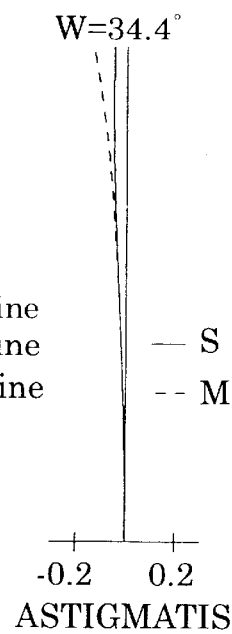
Figure 9D:
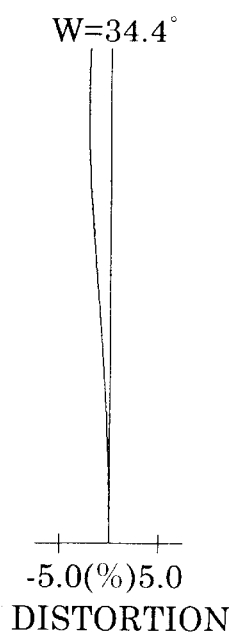
Figure 11A:
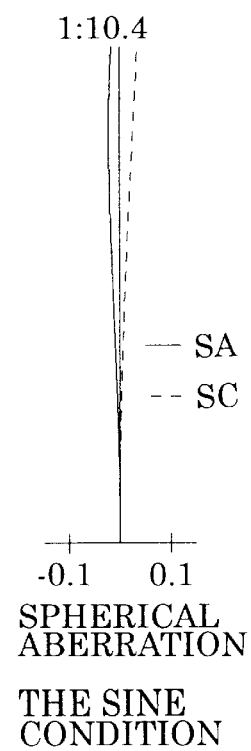
FIGS. 11A, 11B, 11C and 11D are aberration diagrams of the lens arrangement shown in FIG. 10.
Figure 11B:
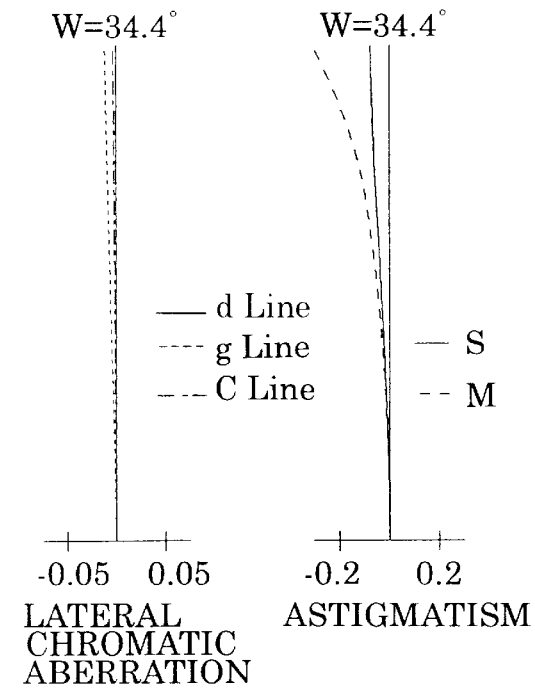
Figure 11C:
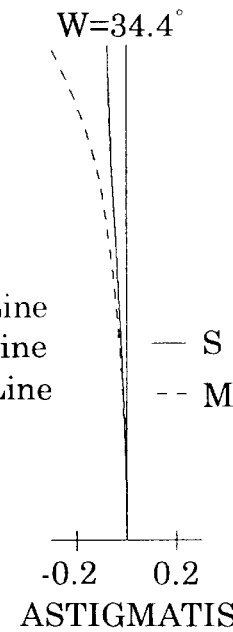
Figure 11D:
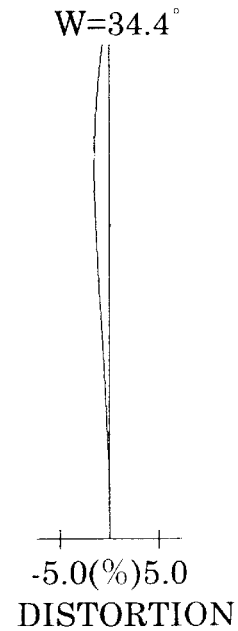

FIG. 10 is a lens arrangement of the second embodiment of the optical system of the composite camera, and FIGS. 11A through 11D are aberration diagrams of the lens arrangement shown in FIG. 10. Table 2 shows the numerical data thereof. Surface Nos. 1 through 16 represent the photographing optical system 11; surface Nos. 17 through 20 represent the condenser lens group 15; surface Nos. 21 through 31 represent the relay optical system 17; and surface Nos. 32 through 35 represent the glass cover (filters included) of the CCD 18. The photographing optical system 11 and the relay optical system 17 of the first and second embodiments are the same, and only the condenser lens group 15 is different from the first embodiment.

TABLE 2

| Photographing Optical System | | Relay Optical System | | |
|---|---|---|---|---|
| $F_{NO}$ = 1:3.5 | | $F_e$ = 1:2.2 | | |
| $f_1$ = 23.03 | | $f_2$ = 13.19 | | |
| W = 34.4 | | m = −0.162 | | |
| $f_{B1}$ = 32.09 | | $f_{B2}$ = 6.96 | | |
| Surface No. | R | D | Nd | ν |
| 1 | 206.849 | 3.97 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |
| Diaphragm | ∞ | 1.50 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71300 | 53.9 |
| 16 | −23.537 | 32.09 | — | — |
| 17 | −539.201 | 10.99 | 1.49176 | 57.4 |

TABLE 2-continued

| | | | | |
|---|---|---|---|---|
| 18 | −33.581 | 2.20 | — | — |
| 19 | 33.581 | 10.99 | 1.49176 | 57.4 |
| 20 | 539.201 | 67.18 | — | — |
| 21 | 11.525 | 1.65 | 1.69680 | 55.5 |
| 22 | 280.000 | 0.10 | — | — |
| 23 | 5.830 | 2.03 | 1.69680 | 55.5 |
| 24 | 42.520 | 0.80 | — | — |
| 25 | 505.700 | 1.05 | 1.80518 | 25.4 |
| 26 | 3.752 | 1.00 | — | — |
| Diaphragm | ∞ | 0.92 | — | — |
| 27 | −4.624 | 1.00 | 1.59270 | 35.3 |
| 28 | 336.653 | 2.03 | 1.88300 | 40.8 |
| 29 | −7.871 | 0.10 | — | — |
| 30 | 14.372 | 1.57 | 1.80400 | 46.6 |
| 31 | −33.385 | 1.54 | — | — |
| 32 | ∞ | 4.16 | 1.51633 | 64.1 |
| 33 | ∞ | 0.50 | — | — |
| 34 | ∞ | 0.75 | 1.51633 | 64.1 |
| 35 | ∞ | — | — | — |

Embodiment 3

FIG. 12 is a lens arrangement of the third embodiment of the optical system of the composite camera, and FIGS. 13A through 13D are aberration diagrams of the lens arrangement shown in FIG. 12. Table 3 shows the numerical data thereof. Surface Nos. 1 through 16 represent the photographing optical system 11; surface Nos. 17 and 18 represent the condenser lens group 15' including a single lens element on which an aspherical surface is formed; surface Nos. 19 through 29 represent the relay optical system 17; and surface Nos. 30 through 33 represent the glass cover (filters included) of the CCD 18.

TABLE 3

| Photographing Optical System | | Relay Optical System | | |
|---|---|---|---|---|
| $F_{NO}$ = 1:3.5 | | $F_e$ = 1:2.2 | | |
| $f_1$ = 23.03 | | $f_2$ = 13.19 | | |
| W = 34.4 | | m = −0.190 | | |
| $f_{B1}$ = 32.09 | | $f_{B2}$ = 7.33 | | |
| Surface No. | R | D | Nd | ν |
| 1 | 206.849 | 3.07 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |
| Diaphragm | ∞ | 1.50 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71300 | 53.9 |
| 16 | −23.537 | 32.09 | — | — |
| 17* | 29.500 | 11.70 | 1.51633 | 64.1 |
| 18 | −36.116 | 65.80 | — | — |
| 19 | 11.525 | 1.65 | 1.69680 | 55.5 |
| 20 | 280.000 | 0.10 | — | — |
| 21 | 5.830 | 2.03 | 1.69680 | 55.5 |
| 22 | 42.520 | 0.80 | — | — |
| 23 | 505.700 | 1.05 | 1.80518 | 25.4 |
| 24 | 3.752 | 1.00 | — | — |

TABLE 3-continued

| | | | | |
|---|---|---|---|---|
| Diaphragm | ∞ | 0.92 | — | — |
| 25 | -4.624 | 1.00 | 1.59270 | 35.3 |
| 26 | 336.653 | 2.03 | 1.88300 | 40.8 |
| 27 | -7.871 | 0.10 | — | — |
| 28 | 14.372 | 1.57 | 1.80400 | 46.6 |
| 29 | -33.385 | 1.54 | — | — |
| 30 | ∞ | 4.16 | 1.51633 | 64.1 |
| 31 | ∞ | 0.50 | — | — |
| 32 | ∞ | 0.75 | 1.51633 | 64.1 |
| 33 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 17 | 0.00 | $-0.1450 \times 10^{-4}$ |

Embodiment 4

FIG. 14 is a lens arrangement of the fourth embodiment of the optical system of the composite camera, and FIGS. 15A through 15D are aberration diagrams of the lens arrangement shown in FIG. 14. Table 4 shows the numerical data thereof. Only the condenser lens group 15' (surface Nos. 17 and 18) is different from the third embodiment. The photographing optical system 11 and the relay optical system 17 are the same as those of the third embodiment.

TABLE 4

| Photographing Optical System | | Relay Optical System | | |
|---|---|---|---|---|
| $F_{NO} = 1:35$ | | $F_e = 1:2.2$ | | |
| $f_1 = 23.03$ | | $f_2 = 13.19$ | | |
| W = 34.4 | | m = -0.189 | | |
| $f_{B1} = 32.09$ | | $f_{B2} = 7.32$ | | |
| Surface No. | R | D | Nd | ν |
| 1 | 206.849 | 3.07 | 1.51633 | 64.1 |
| 2 | -206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |
| Diaphragm | ∞ | 1.50 | — | — |
| 9 | 58.125 | 2.57 | 1.70154 | 41.2 |
| 10 | -58.125 | 1.46 | — | — |
| 11 | 15.350 | 2.79 | 1.69680 | 55.5 |
| 12 | 58.481 | 0.55 | — | — |
| 13 | -123.305 | 5.50 | 1.80518 | 25.4 |
| 14 | 14.523 | 5.54 | — | — |
| 15 | 256.227 | 2.80 | 1.71300 | 53.9 |
| 16 | -23.537 | 32.09 | — | — |
| 17* | 32.451 | 11.70 | 1.51633 | 64.1 |
| 18* | -32.451 | 65.80 | — | — |
| 19 | 11.525 | 1.65 | 1.69680 | 55.5 |
| 20 | 280.000 | 0.10 | — | — |
| 21 | 5.830 | 2.03 | 1.69680 | 55.5 |
| 22 | 42.520 | 0.80 | — | — |
| 23 | 505.700 | 1.05 | 1.80518 | 25.4 |
| 24 | 3.752 | 1.00 | — | — |

TABLE 4-continued

| | | | | |
|---|---|---|---|---|
| Diaphragm | ∞ | 0.92 | — | — |
| 25 | -4.624 | 1.00 | 1.59270 | 35.3 |
| 26 | 336.653 | 2.03 | 1.88300 | 40.8 |
| 27 | -7.871 | 0.10 | — | — |
| 28 | 14.372 | 1.57 | 1.80400 | 46.6 |
| 29 | -33.385 | 1.54 | — | — |
| 30 | ∞ | 4.16 | 1.51633 | 64.1 |
| 31 | ∞ | 0.50 | — | — |
| 32 | ∞ | 0.75 | 1.51633 | 64.1 |
| 33 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 17 | 0.00 | $-0.7242 \times 10^{-5}$ |
| 18 | 0.00 | $0.7242 \times 10^{-5}$ |

Embodiment 5

Figure 16:
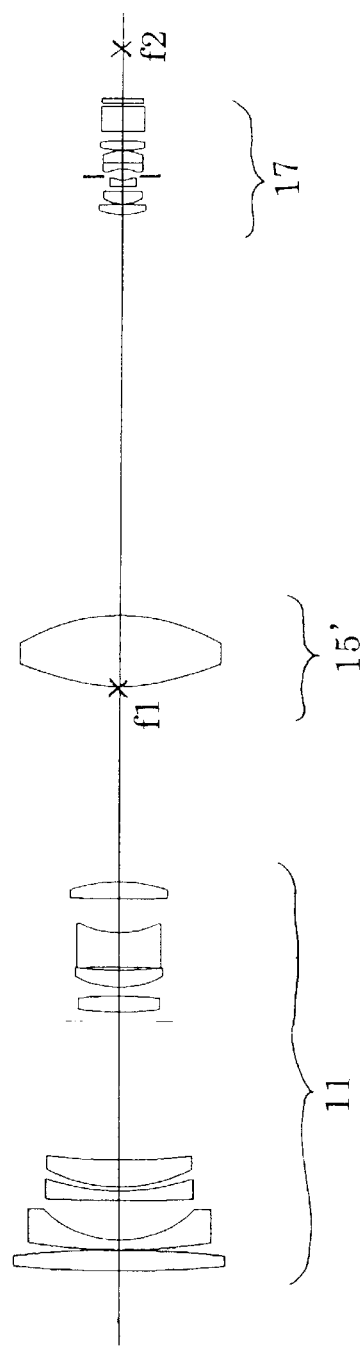
FIG. 16 is a lens arrangement of the fifth embodiment of the optical system of the composite camera.

FIG. 16 is a lens arrangement of the fifth embodiment of the optical system of the composite camera, and FIGS. 17A through 17D are aberration diagrams of the lens arrangement shown in FIG. 16. Table 5 shows the numerical data thereof. Only the condenser lens group 15' (surface Nos. 17 and 18) is different from the third embodiment. The photographing optical system 11 and the relay optical system 17 are the same as those of the third embodiment.

TABLE 5

| Photographing Optical System | | Relay Optical System | | |
|---|---|---|---|---|
| $F_{NO} = 1:3.5$ | | $F_e = 1:2.2$ | | |
| $f_1 = 23.03$ | | $f_2 = 13.19$ | | |
| W = 34.4 | | m = -0.189 | | |
| $f_{B1} = 32.09$ | | $f_{B2} = 7.32$ | | |
| Surface No. | R | D | Nd | ν |
| 1 | 206.849 | 3.07 | 1.51633 | 64.1 |
| 2 | -206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |
| Diaphragm | ∞ | 1.50 | — | — |
| 9 | 58.125 | 2.57 | 1.70154 | 41.2 |
| 10 | -58.125 | 1.46 | — | — |
| 11 | 15.350 | 2.79 | 1.69680 | 55.5 |
| 12 | 58.481 | 0.55 | — | — |
| 13 | -123.305 | 5.50 | 1.80518 | 25.4 |
| 14 | 14.523 | 5.54 | — | — |
| 15 | 256.227 | 2.80 | 1.71300 | 53.9 |
| 16 | -23.537 | 32.09 | — | — |
| 17* | 29.500 | 11.70 | 1.49176 | 57.4 |
| 18 | -32.386 | 65.80 | — | — |
| 19 | 11.525 | 1.65 | 1.69680 | 55.5 |
| 20 | 280.000 | 0.10 | — | — |
| 21 | 5.830 | 2.03 | 1.69680 | 55.5 |
| 22 | 42.520 | 0.80 | — | — |
| 23 | 505.700 | 1.05 | 1.80518 | 25.4 |
| 24 | 3.752 | 1.00 | — | — |

TABLE 5-continued

| Diaphragm | ∞ | 0.92 | — | — |
|---|---|---|---|---|
| 25 | −4.624 | 1.00 | 1.59270 | 35.3 |
| 26 | 336.653 | 2.03 | 1.88300 | 40.8 |
| 27 | −7.871 | 0.10 | — | — |
| 28 | 14.372 | 1.57 | 1.80400 | 46.6 |
| 29 | −33.385 | 1.54 | — | — |
| 30 | ∞ | 4.16 | 1.51633 | 64.1 |
| 31 | ∞ | 0.50 | — | — |
| 32 | ∞ | 0.75 | 1.51633 | 64.1 |
| 33 | ∞ | — | — | — |

*designates the aspherical surface which is rotationally symmetrical with respect to the optical axis.

Aspherical surface data (the aspherical surface data (the aspherical surface coefficients not indicated are zero (0.00)):

| Surface No. | K | A4 |
|---|---|---|
| 17 | 0.00 | $-0.1647 \times 10^{-4}$ |

Embodiment 6

Figure 18:
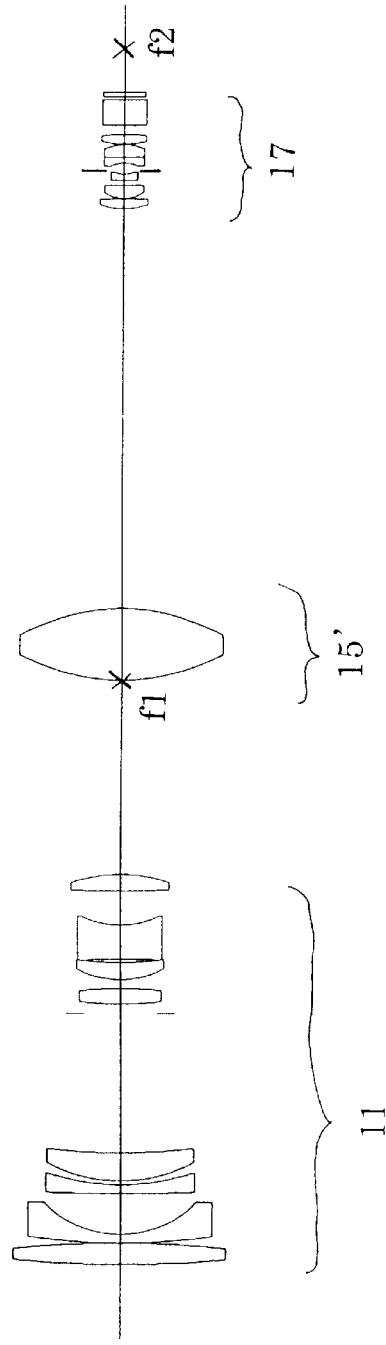
FIG. 18 is a lens arrangement of the sixth embodiment of the optical system of the composite camera.

FIG. 18 is a lens arrangement of the sixth embodiment of the optical system of the composite camera, and FIGS. 19A through 19D are aberration diagrams of the lens arrangement shown in FIG. 18. Table 6 shows the numerical data thereof. Only the condenser lens group 15' (surface Nos. 17 and 18) is different from the third embodiment. The photographing optical system 11 and the relay optical system 17 are the same as those of the third embodiment.

TABLE 6

| Photographing Optical system | | Relay Optical System | | |
|---|---|---|---|---|
| $F_{NO} = 1:3.5$ | | $F_e = 1:2.2$ | | |
| $f_1 = 23.03$ | | $f_2 = 13.19$ | | |
| W = 34.4 | | m = −0.189 | | |
| $f_{B1} = 32.09$ | | $f_{B2} = 7.31$ | | |
| Surface No. | R | D | Nd | ν |
| 1 | 206.849 | 3.07 | 1.51633 | 64.1 |
| 2 | −206.849 | 0.10 | — | — |
| 3 | 112.397 | 1.50 | 1.80610 | 40.9 |
| 4 | 17.827 | 6.44 | — | — |
| 5 | 435.054 | 1.40 | 1.69680 | 55.5 |
| 6 | 36.456 | 0.70 | — | — |
| 7 | 25.758 | 4.50 | 1.80518 | 25.4 |
| 8 | 116.421 | 22.39 | — | — |
| Diaphragm | ∞ | 1.50 | — | — |
| 9 | 58.125 | 2.57 | 1.70154 | 41.2 |
| 10 | −58.125 | 1.46 | — | — |
| 11 | 15.350 | 2.79 | 1.69680 | 55.5 |
| 12 | 58.481 | 0.55 | — | — |
| 13 | −123.305 | 5.50 | 1.80518 | 25.4 |
| 14 | 14.523 | 5.54 | — | — |
| 15 | 256.227 | 2.80 | 1.71300 | 53.9 |
| 16 | −23.537 | 32.09 | — | — |
| 17* | 30.870 | 11.70 | 1.49176 | 57.4 |
| 18* | −30.870 | 65.80 | — | — |
| 19 | 11.525 | 1.65 | 1.69680 | 55.5 |
| 20 | 280.000 | 0.10 | — | — |
| 21 | 5.830 | 2.03 | 1.69680 | 55.5 |
| 22 | 42.520 | 0.80 | — | — |
| 23 | 505.700 | 1.05 | 1.80518 | 25.4 |
| 24 | 3.752 | 1.00 | — | — |

TABLE 6-continued

| Diaphragm | ∞ | 0.92 | — | — |
|---|---|---|---|---|
| 25 | −4.624 | 1.00 | 1.59270 | 35.3 |
| 26 | 336.653 | 2.03 | 1.88300 | 40.8 |
| 27 | −7.871 | 0.10 | — | — |
| 28 | 14.372 | 1.57 | 1.80400 | 46.6 |
| 29 | −33.385 | 1.54 | — | — |
| 30 | ∞ | 4.16 | 1.51633 | 64.1 |
| 31 | ∞ | 0.50 | — | — |
| 32 | ∞ | 0.75 | 1.51633 | 64.1 |
| 33 | ∞ | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 17 | 0.00 | $-0.8231 \times 10^{-5}$ |
| 18 | 0.00 | $0.8231 \times 10^{-5}$ |

Table 7 shows conditions (1) of each embodiment.

TABLE 7

| | Embod. 1 | Embod. 2 | Embod. 3 | Embod. 4 | Embod. 5 | Embod. 6 |
|---|---|---|---|---|---|---|
| Cond. (1) | 0.518 | 0.585 | 0.508 | 0.497 | 0.422 | 0.598 |

Embodiments 1 through 6 satisfy condition (1). Furthermore, aberrations can be satisfactorily corrected.

According to the above descriptions, the conjugate relationship between the first image-forming optical system and the second image-forming optical system can be established by the condenser lens group including two or more lens elements, or including a single lens element having at least one aspherical surface thereon, and thereby a composite camera, which causes no eclipse in the second image-forming optical system even if the aperture of the first image-forming optical system is reduced, can be obtained.

What is claimed is:

1. An optical system of a composite camera comprising a first image-forming optical system, and a second image-forming optical system for re-imaging an image, formed on an image plane equivalent to an image plane of said first image-forming optical system, onto a predetermined position;

wherein a condenser lens group, comprising one of at least two lens elements and a single lens element on which at least one aspherical surface is formed, is provided between said equivalent image plane and said second image-forming optical system; and wherein said optical system of said composite camera satisfies the following condition at any image height on said equivalent image plane:

$$\Delta\theta Pmax - \Delta\theta Pmin < 2°$$

wherein

ΔθPmax designates the maximum value of ΔθP(y)= θBP(y)−θAP(y);

ΔθPmin designates the minimum value of ΔθP(y)=θBP(y)−θAP(y);

$\Delta\theta AP(y)$ designates an angle of incidence, at an image height y, of a principal ray which is transmitted through said first image-forming optical system, and is incident on said equivalent image plane; and $\Delta\theta BP(y)$ designates an angle of incidence, at said image height y on said equivalent image plane, of a principal ray to be incident on said predetermined position, through said first image-forming optical system, said condenser lens group and said second image-forming optical system.

2. The optical system of a composite camera according to claim 1, wherein said first image-forming optical system is a photographing optical system with respect to a silver halide film; and wherein said second image-forming optical system is a photographing optical system with respect to an image pick-up device which is provided at said predetermined position.

3. The optical system of a composite camera according to claim 1, wherein said equivalent image plane is formed by a mirror provided between said first image-forming optical system and said image plane thereof.

4. The optical system of a composite camera according to claim 1, wherein a mechanical diaphragm with a variable aperture is provided in at least said first image-forming optical system.

* * * * *